United States Patent
Braeuchle et al.

(10) Patent No.: US 12,202,460 B2
(45) Date of Patent: Jan. 21, 2025

(54) METHOD FOR CONTROLLING THE ACTIVATION OF AN ELECTRICALLY CONTROLLABLE ACTUATOR IN A MOTOR VEHICLE, AND ELECTRONIC CONTROL DEVICE FOR CARRYING OUT THIS METHOD

(71) Applicant: Robert Bosch GmbH, Stuttgart (DE)

(72) Inventors: Goetz Braeuchle, Reichartshausen (DE); Margarete Deutscher, Obersulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 17/774,344

(22) PCT Filed: Nov. 5, 2020

(86) PCT No.: PCT/EP2020/081040
§ 371 (c)(1),
(2) Date: May 4, 2022

(87) PCT Pub. No.: WO2021/139912
PCT Pub. Date: Jul. 15, 2021

(65) Prior Publication Data
US 2022/0402469 A1 Dec. 22, 2022

(30) Foreign Application Priority Data
Jan. 11, 2020 (DE) ...................... 10 2020 200 287.8

(51) Int. Cl.
*B60T 8/88* (2006.01)
*B60T 17/22* (2006.01)

(52) U.S. Cl.
CPC ............ *B60T 8/885* (2013.01); *B60T 17/221* (2013.01); *B60T 2270/406* (2013.01)

(58) Field of Classification Search
CPC ... B60T 8/885; B60T 17/221; B60T 2270/406
See application file for complete search history.

(56) References Cited

U.S. PATENT DOCUMENTS

| | | | | |
|---|---|---|---|---|
| 5,526,292 A | * | 6/1996 | Hodgson | .......... G10K 11/17857 381/71.4 |
| 6,410,993 B1 | | 6/2002 | Giers | |

(Continued)

FOREIGN PATENT DOCUMENTS

| | | |
|---|---|---|
| CN | 103863224 A | 6/2014 |
| CN | 104884317 A | 9/2015 |

(Continued)

OTHER PUBLICATIONS

"Ignazio Dimino et al. Active Noise Control for Aircraft Cabin Seats (2022) abstract" (Year: 2022).*

(Continued)

*Primary Examiner* — Gertrude Arthur Jeanglaude
(74) *Attorney, Agent, or Firm* — NORTON ROSE FULBRIGHT US LLP; Gerard A. Messina

(57) ABSTRACT

A method for the control of the activation of an electrically controllable actuator in a motor vehicle, in particular for the purpose of checking its operational reliability, and an electronic control device for carrying out this method. An electrically controllable first actuator, an electrically controllable second, redundant, actuator, and at least one electronic control device for the electrical actuation of the actuators, are provided. An activation of the second actuator by the electronic control device is carried out as a function of signal information which represents a noise level prevailing in a passenger compartment of the motor vehicle.

8 Claims, 2 Drawing Sheets

(56) References Cited

U.S. PATENT DOCUMENTS

| | | | |
|---|---|---|---|
| 7,305,290 B2* | 12/2007 | Russ | E05F 15/40 |
| | | | 701/49 |
| 8,270,628 B2* | 9/2012 | Evert | G10K 11/17823 |
| | | | 381/71.4 |
| 9,476,430 B2* | 10/2016 | Immendoerfer | F02D 41/062 |
| 10,358,119 B2 | 7/2019 | Besier et al. | |
| 11,326,656 B2* | 5/2022 | Resvoll | F16D 48/06 |
| 2017/0282877 A1 | 10/2017 | Besier et al. | |

FOREIGN PATENT DOCUMENTS

| | | | |
|---|---|---|---|
| CN | 105026229 A | 11/2015 | |
| CN | 105934584 A | 9/2016 | |
| CN | 108016419 A | 5/2018 | |
| CN | 109677390 A | 4/2019 | |
| DE | 102014007797 A1 | 11/2015 | |
| DE | 102015009443 A1 | 3/2016 | |
| JP | H02123153 U | 10/1990 | |
| JP | H1024826 A | 1/1998 | |
| JP | H1191400 A | 4/1999 | |
| JP | 2005297780 A | 10/2005 | |
| JP | 2007516123 A | 6/2007 | |
| JP | 2008189063 A | 8/2008 | |
| WO | 2009015962 A1 | 2/2009 | |

OTHER PUBLICATIONS

International Search Report for PCT/EP2020/081040, Issued Feb. 3, 2021.

* cited by examiner

METHOD FOR CONTROLLING THE ACTIVATION OF AN ELECTRICALLY CONTROLLABLE ACTUATOR IN A MOTOR VEHICLE, AND ELECTRONIC CONTROL DEVICE FOR CARRYING OUT THIS METHOD

FIELD

The present invention relates to a method for controlling the activation of an electronically controllable actuator in a motor vehicle, and to an electronic control device.

BACKGROUND INFORMATION

Modern vehicles are equipped with a multitude of electronic control systems whose purpose it is to support the driver, improve the driving comfort and/or increase the driving safety, for example. Such control systems include actuators which can be electrically actuated as a function of the instantaneous driving situation. Electronic control devices are provided for the actuation of the actuators.

Conventional in this context are electronically slip-controllable brake systems in motor vehicles which counteract unstable driving states even before they occur. The latter are based on an impending or already existing wheel slip, i.e., at one or more blocked wheels of the vehicle. For instance, this may occur during a braking operation, in the course of a driving operation and also when the vehicle picks up speed. Occurring wheel slip is able to be reduced or even entirely avoided by controlling the brake pressure of the wheel brakes of the affected wheels. To this end, brake systems are equipped with actuators in the form of an electrically controllable brake pressure generator and also such valves.

Moreover, the use of motor vehicles that—at least under certain conditions—are able to be piloted or operated even autonomously, i.e., without a driver, is currently on the rise. Such vehicles are equipped with brake systems provided with redundant actuators so that in the event of a malfunction or a failure of an actuator, a second actuator is available which can take over the buildup of brake pressure.

To prevent possible failures of actuators already in advance, their function is usually checked at regular intervals. The check intervals may vary as a function of an elapsed time since the most recent check, the actual operating period and/or the loading to which the respective actuators have been subjected. For redundant actuators, this function check is of particular relevance because their function is required when a problem in a primary actuator has already manifested itself.

However, a disadvantage of these function checks is the noise development that comes about when the actuators are actuated. The occurring operating noise has an adverse effect on the comfort experience of the vehicle passengers and may furthermore trigger irritation with regard to the proper function status of the vehicle and its control systems, the latter not least because the check intervals and thus the instants at which the check processes are started vary and thus often come as a surprise to the driver.

The aforementioned problem arises in particular in vehicles that are equipped with an electric drive because the lack of an engine noise causes the operating noise of the actuators to be perceived more clearly in these vehicles than in vehicles driven in the conventional manner. In addition, for safety-related reasons, the number of necessary function checks is greater in vehicles that are equipped with systems provided with redundant actuators.

SUMMARY

An object of the present invention includes coordinating the instant for the performance of a function check of a redundant second actuator in such a way that the noise load caused in the process is kept to a minimum for the vehicle passengers.

According to an example embodiment of the present invention, in a method, an activation of the second actuator is carried out as a function of a signal which represents a noise level prevailing in a passenger compartment of the motor vehicle. If the noise level there is relatively low, that is, a noise level that is lower than the operating noise of the second actuator perceivable in the passenger compartment, then the activation of the second actuator will not take place. If this noise level in the passenger compartment subsequently rises to or beyond a specifiable limit value which at least approximately corresponds to the operating noise of the second actuator audible in the passenger compartment, then the activation of the second actuator will commence. The operating noise of the second actuator is then at least largely drowned out by the noise level in the interior of the passenger compartment and will not be perceived as irritating by the vehicle passengers.

Additional advantages or advantageous further refinements of the present invention result from the disclosure herein.

In one advantageous refinement of the present invention, the actuators of the motor vehicle are coupled with one another via a data bus system and exchange data signals that represent the current operating state of the respective actuators. Based on these data signals, the internal noise prevailing in the passenger compartment of the vehicle is able to be inferred indirectly and the activation of the second actuator be controlled accordingly. A direct measurement of the noise level in the passenger compartment is therefore not absolutely required, and pertinent measuring devices may thus be saved in an advantageous manner.

Nevertheless, a direct measurement of the noise level in the passenger compartment may provide advantages insofar as environmental noise that is not attributable to the operating noise of a first actuator is then able to be taken into account in the actuation of the second actuator. In an advantageous manner, the noise level in the passenger compartment may be acquired through a hands-free device of a telecommunications device of the vehicle for this purpose. Such hands-free devices are already provided in many vehicles as it is, which means that no noise-acquiring devices are required that must be installed in addition. The acquired noise is then converted into a data signal and made available to the electronic control device via the data bus system.

In addition to noise from the environment outside the vehicle, noise from entertainment media in the vehicle and/or from climate control devices of the vehicle, for example, may also be considered via the data bus system.

The noise acquisition in the passenger compartment should preferably take place in the region of the driver seat of the vehicle and in particular at the level of a head of the driver in order to relieve the driver of bothersome operating noise and thus not to interfere with his or her concentration on the road traffic.

In accordance with an example embodiment of the present invention, it is furthermore advantageous to consider the velocity of the vehicle in the control of an activation of the second actuator. The vehicle velocity provides valuable information about potentially occurring wind or tire noise of the vehicle without the need to carry out a direct measurement of this noise out for this purpose.

The method for the control of the activation of a second, redundant actuator is carried out by an electronic control device. In an advantageous manner, for instance, the control device of a brake system of the vehicle that implements the control of wheel slip is able to be refined for this purpose. As a result, the provided method is able to be implemented in a particularly economical and compact manner.

An exemplary embodiment of the present invention is shown in the figures and will be described in detail in the following description.

DETAILED DESCRIPTION OF EXAMPLE EMBODIMENTS

The present invention described in the following text relates to an electrically controllable system, in particular for a motor vehicle, which preferably has mutually redundant actuators to guarantee the proper functioning. In this context, the present invention is described in connection with the example of an electronically slip-controllable brake system of a motor vehicle which drives at least in a piloted manner, although the present invention is not necessarily restricted to such a motor vehicle or such a brake system. Possible other redundant systems of a motor vehicle can be an electrical steering system or an electrical chassis control system, for example.

Figure 1:
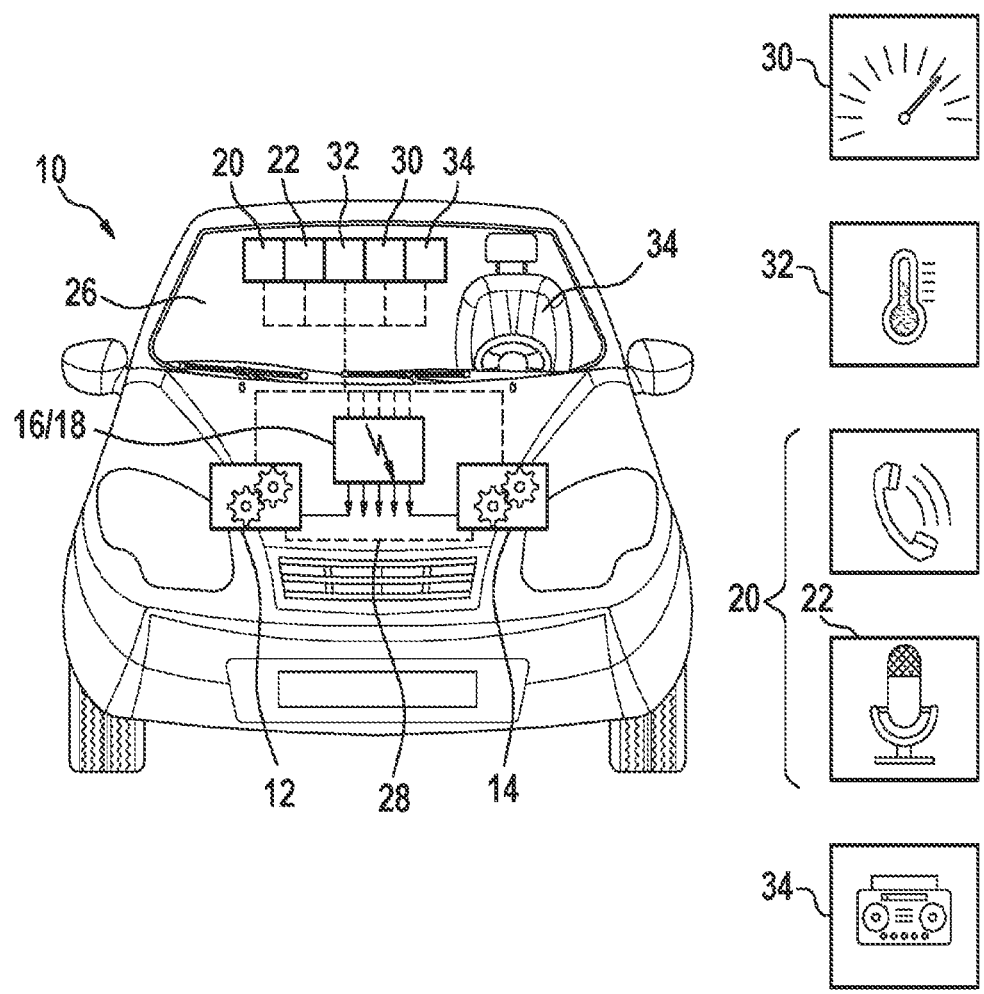
FIG. 1 shows the schematically simplified representation of a motor vehicle on which the present invention is based.

FIG. 1 shows a schematically greatly simplified representation motor vehicle 10, which is equipped with a multitude of electrically controllable actuators. For example, a drive train, a chassis, i.e., steering and damping, a climate control system for a passenger compartment, an entertainment or communications system, and/or in particular a brake system of motor vehicle 10 are provided with such actuators. By way of example, only the brake system will be addressed in greater detail in the following text, but the comments similarly apply to the other systems.

The brake system has actuators 12, 14 in the form of pressure generators to generate a hydraulic brake pressure in installed wheel brakes of the vehicle. These pressure generators are redundantly provided, especially in an autonomously driving motor vehicle, for the purpose of maintaining the brake function of vehicle 10 even when an unexpected malfunction occurs in an actuator 12; 14. At least one electronic control device 16 is installed in motor vehicle 10 for the electrical actuation of the pressure generators or actuators 12, 14. In most cases, a separate control device 16 is assigned to each actuator 12; 14, but these individual control devices are also able to be combined into one or more control device units.

In addition, illustrated motor vehicle 10 is equipped with a telecommunications device 20, which has a hands-free device provided with a microphone 22. The hands-free device and microphone 22 are disposed in the region of a driver seat 24 in a passenger compartment 26 of the motor vehicle 10, preferably at a height of the head of the driver. In this way, noise in passenger compartment 26 that has an especially adverse effect on the attention and perception of the driver is acquired and taken into consideration.

Mentioned actuators 12; 14 of motor vehicle 10 are coupled with one another and with control device 26 by way of a data bus system 28. Data bus system 28 conducts data signals indicating the operating state of the respective connected actuators 12; 14 to this control device 16. The data signals preferably have a digital data format.

According to the present invention, control device 16 evaluates the incoming data signals with regard to the noise emissions of individual actuators 12, 14, in particular with regard to noise emissions of these actuators 12, 14 that are perceivable in a passenger compartment 26 of motor vehicle 10. Characteristic curves representing the noise emissions of individual actuators 12, 14 as a function of the respective data signals were ascertained in preceding tests and are stored in electronic control device 16. Control device 16 carries out an activation of a second actuator 14 provided redundantly to first actuator 12 as a function of these noise emissions perceivable in passenger compartment 26 when the noise emissions of this second actuator 14 are suitable for maintaining without change and/or attenuating the noise level occurring in passenger compartment 26 and/or for improving the sound audible to a driver.

An activation of second actuator 14 is therefore not necessarily based on a direct measurement of the noise in passenger compartment 26, but the noise is derived indirectly from the available data signals that represent an operating state of actuators 12, 14. Thus, the noise level in passenger compartment 26 is inferred from the operating data of actuators 12, 14 so that a direct measurement of this noise level in passenger compartment 26 is able to be dispensed with as are pertinent measuring devices in motor vehicle 10.

Nevertheless, in some cases it may be useful to measure the actual noise in passenger compartment 26, for instance so that environmental noise that is unable to be acquired via the data bus system due to the lack of an actuator is able to be taken into account via this noise. Wind noise, tire noise, and/or noise from the environment of motor vehicle 10, for example, should be mentioned in this context.

In such a case, the noise level of passenger compartment 26 would be acquired with the aid of a microphone 22, then converted into a digital data format and conveyed via data bus system 28 to electronic control device 16 for an evaluation. The microphone of a hands-free device of a telecommunications device 20 of motor vehicle 10 as it is often installed in modern motor vehicles anyway can be used as microphone 22. As a result, no additional hardware installation is required for the noise measurement.

The data signals from velocity measuring devices 30 of motor vehicle 10 may additionally be taken into account via data bus system 28. The vehicle velocity also allows inferences with regard to wind and tire noise of motor vehicle 10 without the need to acquire these noises directly with the aid of measuring technology. The same applies to data signals that are available from entertainment media 34 or a climate control system 32 of motor vehicle 10 and which affect the noise level in passenger compartment 26 as a function of the manner in which these devices are operated (e.g., fan: strong/weak/off; radio: loud/soft/off etc.).

According to the present invention, the activation of a redundantly provided second actuator 14 for the purpose of checking its operational reliability is carried out only when a noise emission of this one second actuator 14 is suitable for maintaining and/or lowering the noise level in passenger compartment 26 and/or for improving its sound that is audible to the driver. However, if such lowering of the noise is not possible because the function test of a redundant second actuator 14 is performed and a function test can no longer be postponed for safety-related reasons, then the function check must naturally be carried out nevertheless. Via data bus system 28, the other existing actuators will then be notified of the performed activation of redundant second actuator 14. This enables control device 16 to take into operation, simultaneously with first and second actuators 12, 14, other redundantly provided actuators for which a function test is likewise coming up provided the noise level in passenger compartment 26 does not rise or worsen in the sound that the driver can hear.

Figure 2:
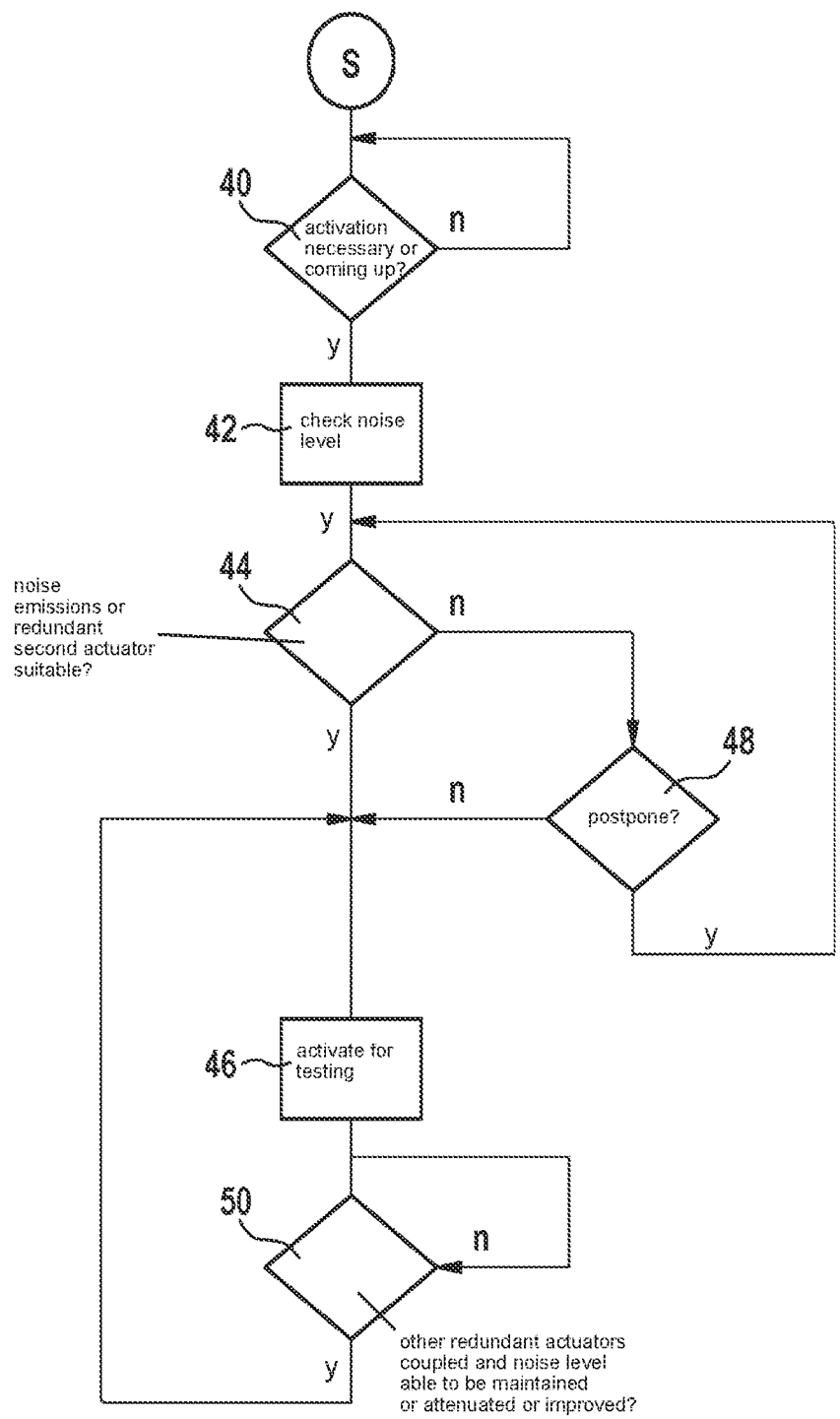
FIG. 2 shows an example embodiment of the present invention based on a flow diagram.

The method on which the present invention is based is illustrated in FIG. 2 with the aid of a flow diagram.

In a first step 40 of the present method, at least one electronic control device 16 determines whether an activation is necessary or is coming up for a redundant second actuator 14 for the purpose of carrying out a check of its operational reliability (function test).

If yes, then it is checked in a further step 42 what noise level is present in passenger compartment 26 of motor vehicle 10. To this end, electronic control device 16 evaluates data signals from data bus system 28 which indicate the operating state of mutually coupled actuators 12, 14 with regard to their noise emissions in passenger compartment 26 and offsets them against the noise emissions of redundant second actuator 14.

In next step 44, electronic control device 16 determines whether the noise emissions of redundant second actuator 14 are suitable for maintaining or attenuating the noise level in passenger compartment 26 and/or are suitable for improving the sound perceivable by the driver. If yes, the activation of redundant second actuator 14 for testing its operational reliability takes place in step 46.

In the other case, it is checked in step 48 whether a function test of redundant second actuator 14 is able to be postponed. If this is the case, then the previously described method is carried out at a later time that is more suitable as far as the noise emissions are concerned.

If the function test does not allow for a further postponement, then it will be carried out by electronic control device 16 despite unfavorable preconditions with regard to the noise level in passenger compartment 26, and a data signal that represents the activation of redundant second actuator 14 is output via data bus system 28.

In a following step 50, it is checked whether other redundant actuators for which a function test is required are coupled with data bus system 28 and whether the noise level in passenger compartment 26 as a result of the performance of the function test of these further redundant actuators is able to be maintained or attenuated or improved in its sound.

If this is the case, the particular actuator is likewise actuated by electrical control device 16 in step 52 for performing the function test, and in the other case, the querying will be repeated at a later point in time.

Changes or supplementations to the described exemplary embodiment that go beyond the described matter are of course possible without departing from the basic features of the present invention.

What is claimed is:

1. A method for controlling activation of an electrically controllable actuator in a motor vehicle for the purpose of checking operational reliability of the electrically controllable actuator, the motor vehicle being equipped with an electrically controllable first actuator, an electrically controllable second actuator existing redundantly to the first actuator, and at least one electronic control device for electrical actuation of the first and second actuators, the method comprising:
   controlling an activation of the second actuator by the electronic control device as a function of signal information which represents a noise level prevailing in a passenger compartment of the motor vehicle;
   wherein:
      the first and second actuators of the motor vehicle are coupled with one another and the electronic control device via a data bus system, and exchange data signals, which represent the operating state of the first and second actuators;
      the electronic control device uses the acquired operating states of the first and second actuators to evaluate potential noise emissions; and
      the activation of the second actuator takes place when a noise emission of the second actuator is suitable for maintaining and/or lowering the noise level in the passenger compartment of the motor vehicle and/or for improving it in its sound perceivable by a driver.

2. The method as recited in claim 1, wherein at least one data signal is made available to the electronic control device via the data bus system, which represents a velocity of the motor vehicle, and/or an operation of an entertainment medium, and/or an operation of a climate control device of the passenger compartment of the motor vehicle, and wherein the at least one data signal is processed by the electronic control device into the signal information about the noise level prevailing in the passenger compartment.

3. The method as recited in claim 1, wherein the noise level in the passenger compartment is measured, converted into a data signal, and made available to the electronic control device via the data bus system for the control of the activation of the at least one second actuator.

4. The method as recited in claim 3, wherein the noise level of the passenger compartment is measured using a hands-free communications device of a telecommunications device.

5. The method as recited in claim 3, wherein the noise level of the passenger compartment is measured in a region of a driver seat, at a level of a potential position of a head of a driver.

6. The method as recited in claim 1, wherein a data signal about a performed activation of the second actuator is transmitted to other actuators of the motor vehicles coupled via the data bus system.

7. An electronic control device for a control of slip at a wheel of a brake system of a motor vehicle, the electronic control device configured to control activation of an electrically controllable actuator in a motor vehicle for the purpose of checking operational reliability of the electrically controllable actuator, the motor vehicle being equipped with an electrically controllable first actuator, an electrically controllable second actuator existing redundantly to the first actuator, and the electronic control device configured for electrical actuation of the first and second actuators, the electronic control device configured to:
   control an activation of the second actuator as a function of signal information which represents a noise level prevailing in a passenger compartment of the motor vehicle;
   wherein:
      the first and second actuators of the motor vehicle are coupled with one another and the electronic control device via a data bus system, and exchange data signals, which represent the operating state of the first and second actuators;

the electronic control device uses the acquired operating states of the first and second actuators to evaluate potential noise emissions; and the activation of the second actuator takes place when a noise emission of the second actuator is suitable for maintaining and/or lowering the noise level in the passenger compartment of the motor vehicle and/or for improving it in its sound perceivable by a driver.

8. The electronic control device as recited in claim 7, wherein at least one data signal is made available to the electronic control device via the data bus system, which represents a velocity of the motor vehicle, and/or an operation of an entertainment medium, and/or an operation of a climate control device of the passenger compartment of the motor vehicle, and wherein the at least one data signal is processed by the electronic control device into the signal information about the noise level prevailing in the passenger compartment.

* * * * *